Patented Mar. 29, 1938

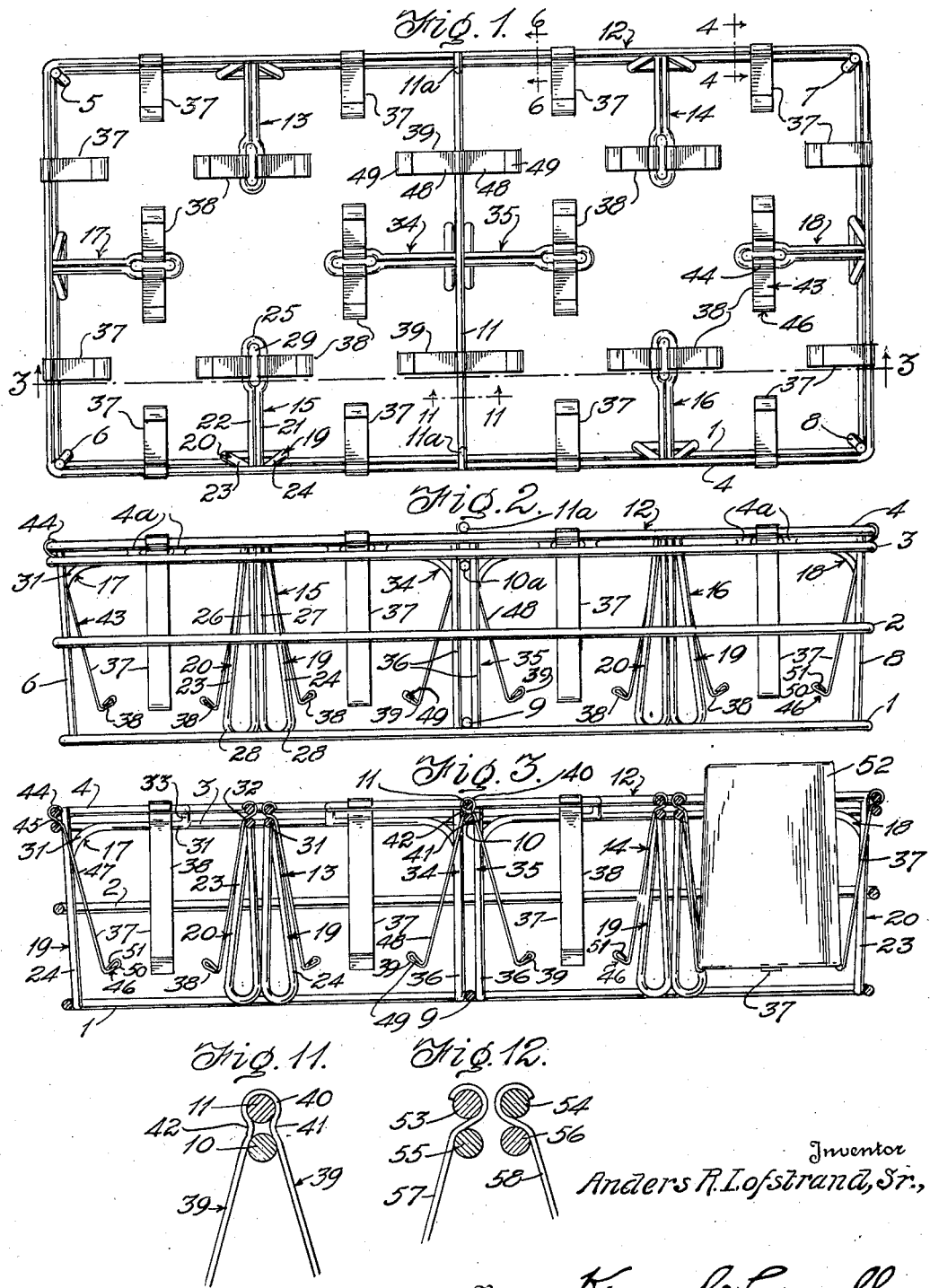

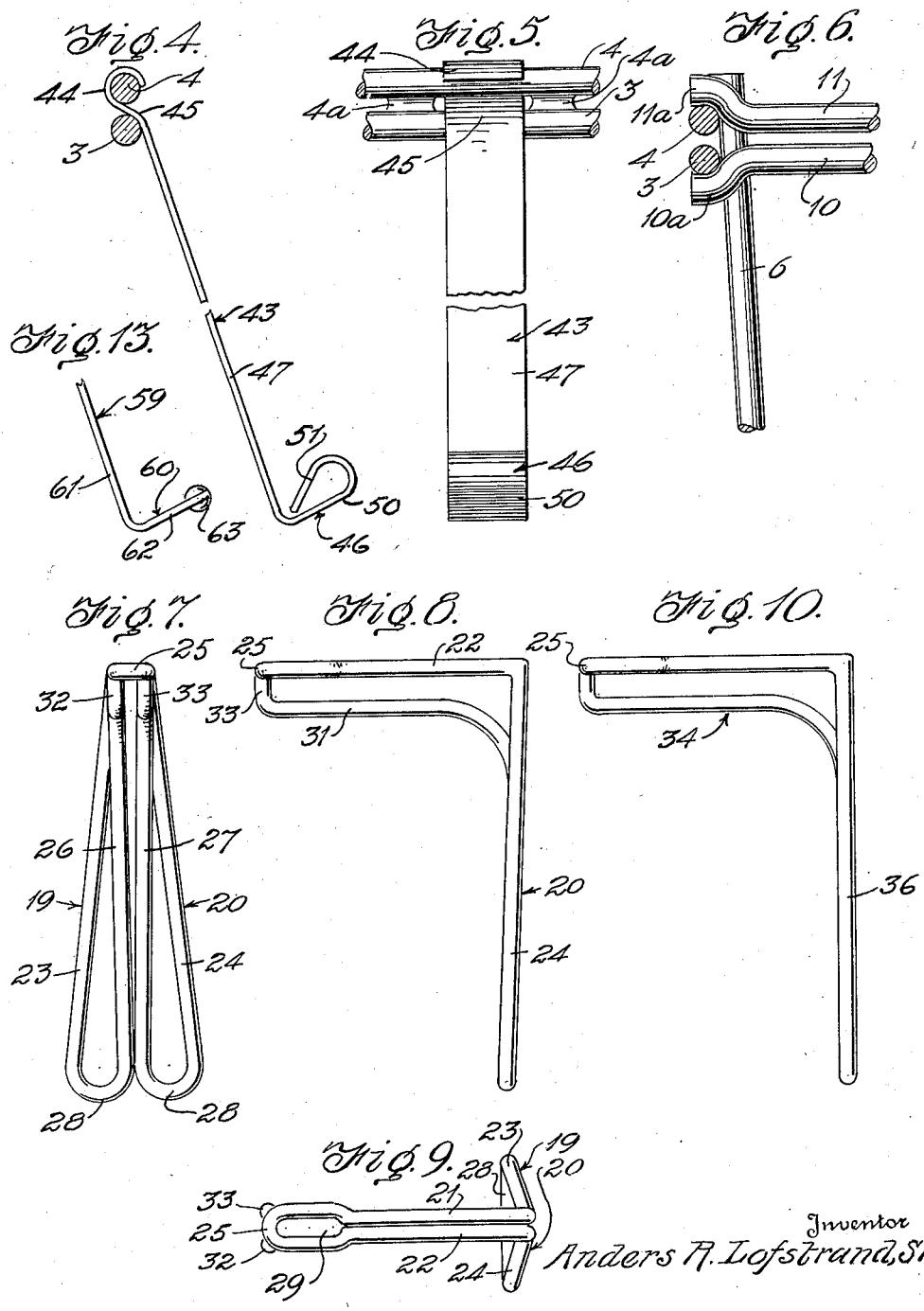

2,112,404

UNITED STATES PATENT OFFICE 2,112,404

BASKET

Anders R. Lofstrand, Sr., Washington, D. C.

Application December 14, 1936, Serial No. 115,870

5 Claims. (Cl. 141—3)

This invention relates to a basket or tray designed primarily for holding a group of drinking glasses during the washing, rinsing and drying of these latter and is designed primarily for use in connection with glass washing, rinsing and drying machines, such as disclosed by Letters Patent 1,992,920 and 2,052,835, but it is to be understood that a basket, in acordance with this invention may be employed for any purpose for which it is found applicable.

The invention has for its object to provide, in a manner as hereinafter set forth, a basket having means for supporting and latching a group of drinking glasses in inverted spaced relation and in a position to have applied to the inner and outer peripheries of the glasses of the group simultaneously successive washing, rinsing and drying operations.

A further object of the invention is to provide, in a manner as hereinafter set forth, a basket for the purpose referred to having its bottom completely open to prevent any obstruction to the operation of the cleansing brushes for the glasses during the washing, rinsing and drying operation.

The basket with the glasses retained therein in inverted position is adapted to be first lowered in and held in lowered position within a washing compartment containing a body of water and brushes for acting upon the outer and inner peripheries of the glasses; after the washing operation, the tray or basket with the washed glasses retained therein is removed from the washing compartment, lowered with the glasses in and held in lowered position within a rinsing compartment and while in the latter the glasses have their inner and outer peripheries subjected to a rinsing operation; after the rinsing operation the basket with the glasses retained therein is removed from the rinsing compartment and positioned at the top of a drying compartment and when so positioned the glasses are subjected to currents of heated air that act to thoroughly dry the glasses interiorly and exteriorly which operation is carried out by the machine disclosed by Patent 2,052,835 aforesaid.

The basket is of skeleton form with its bottom substantially completely open to provide for the passage upwardly into the basket of brushes to act upon the inner and outer faces of the bodies of the glasses and to permit of the extending upwardly into the inverted glasses rinsing water and heated air discharged from elements such as shown in Patent 2,052,835 aforesaid. The brushes which act upon the glasses are rotatable and also impart a revoluble movement to the glasses retained within the basket and such action is disclosed in the Patent 2,052,835.

Further objects of the invention are to provide, in a manner as hereinafter set forth, a basket for the purpose referred to formed throughout of a skeleton body part and which is simple in its construction, strong, durable, compact, conveniently handled, permitting of the convenient inserting and removing of the glasses, readily assembled and comparatively inexpensive to manufacture.

With the foregoing and other objects in view, the invention consists of the novel construction, combination and arrangement of parts as will be more specifically described and are as illustrated in the accompanying drawings, wherein is shown the preferred embodiment of the invention, but it is to be understood that changes, variations and modifications may be resorted to which fall within the scope of the invention as claimed.

In the drawings:—

Figure 1 is a top plan view of the basket,

Figure 2 is a side elevation of the basket,

Figure 3 is a longtiudinal sectional view of the basket,

Figure 4 is a section on line 4—4, Figure 1,

Figure 5 is an elevation looking towards one face of the form of the majority of the latchable, resilient suspensions forming elements of the basket and with such form in suspended position, Figure 6 is a section on line 6—6, Figure 1, Figure 7 is an elevation looking towards the inner face of the form of outer supports employed, Figure 8 is a side elevation of the form of outer support shown in Figure 7, Figure 9 is a top plan of the form of outer support shown in Figure 7, Figure 10 is a side elevation of the form of inner supports employed, Figure 11 is a section on line 11—11, Figure 1, Figure 12 is a fragmentary view in section of a modification of the body part of the basket, and Figure 13 is a fragmentary view looking towards the side edge of a modified form of a resilient latching suspension.

The basket is of skeleton form, preferably of rectangular contour and open at its top, bottom, sides and ends. The basket includes a body part formed of a lower frame 1, an intermediate frame 2, a pair of upper frames 3, 4, corner posts 5, 6, 7 and 8, a lower transverse brace 9, and a pair of upper transverse braces 10, 11. The frame 2 is of slightly greater dimensions throughout than that of frame 1. The frames 3, 4 are of like dimensions, but slightly greater than that of frame 2. The frames 3, 4 are arranged in close proximity to each other in superposed relation and have interposed therebetween spaced bodies 4ª of welding material for securely connecting them together in spaced relation. The frame 2 is spaced a greater distance from frame 1 and from frame 3 than the distance frame 4 is spaced from frame 3. The corner posts are arranged within and welded to the inner faces of the corners of the frames. The corner posts extend from the lower face of frame 1 to the upper face of frame 4 and are slightly inwardly inclined from their upper to their lower ends. The brace 9 is disposed at the transverse center of the body part of the basket and has the lower face of its end terminal portions welded to the upper face of frame 1. The braces 10, 11 are arranged in superposed spaced parallel relation at the said transverse center. The end terminal portions of the brace 10 indicated at 10ª are offset downwardly and the end terminal portions 11ª of the brace 11 are offset upwardly (Figures 2 and 6) to position the intermediate portions of the braces in close relation. The brace 10 has the upper face of its end terminal portions 10ª welded to the lower faces of frame 3. The brace 11 has the lower face of its end terminal portions 11ª welded to the upper face of frame 4. The frames 3, 4 reinforce the top of the sides and ends of the body part. The frames 1, 2, 3 and 4, corner posts 5, 6, 7 and 8 and braces 9, 10 and 11 are formed of steel wire of the desired gauge. The body part of the basket is generally indicated at 12.

The basket includes upstanding outer supports which correspond in height to and extend inwardly from the sides and ends of body part 12. A pair of spaced aligned outer supports are welded to each side and a single outer support is welded to each end of body part 12. The supports at one side are indicated at 13, 14 and those at the other side at 15, 16. The support at one end is designated 17 and the one at the other end at 18. The supports 13, 14, 15 and 16 are spaced equi-distant from the transverse braces and the ends of body part 12. The supports 17, 18 are disposed centrally of the ends of the sides of said body part. The supports 13, 14, 15, 16, 17 and 18 are of like form and constructed from a length of steel wire of the desired gauge bent in the desired manner. Each outer support (Figures 2, 7, 8 and 9) includes a pair of upstanding stems 19, 20 of loop-like contour and a pair of horizontally disposed inner sidewise aligned upper hanger arms 21, 22 extending inwardly at right angles from the upper ends of the outer side portions 23, 24 of the stems 19, 20 respectively. The outer ends of the arms 21, 22 merge into a coupler 25 therefor. The inner side portions 26, 27 of the stems 19, 20 respectively are of less height than the outer side portions of said stems. The side portions of each stem incline in a direction towards each other from their lower to their upper ends. The side portions of each stem are connected together at their lower ends by a coupler 28. Each stem inclines inwardly from its upper to its lower end. The arms 21, 22 inner sidewise abut for the major portion of their length. The remaining portion of the length of arms 21, 22 are spaced from each other to provide in connection with the coupler 25 an oval-shaped elongated loop 29. Each support further includes a pair of lower hanger arms 30, 31 which are horizontally disposed, arranged below and in spaced alignment relative to the arms 21, 22 respectively, extend inwardly at right angles to and merge at their outer ends into the upper ends of the side portions 26, 27 respectively of the stems 19, 20. The inner ends of the arms 30, 31 are upturned as at 32, 33 respectively to abut the lower face of coupler 25. The said upturned ends of the arms 30, 31 are welded to coupler 25.

The basket includes a pair of oppositely disposed inner supports 34, 35 of the same construction as any one of the other of said supports with this exception that the stems 36 (Figure 10) of each inner support are vertical and not disposed at an inclination as are the stems of the outer supports 13 to 18 both inclusive as shown in Figure 8. The stems 36 of supports 34 are welded to one side and centrally of the braces 9, 10 and 11 as shown in Figure 3. The stems 36 of the support 35 are welded to the other side and centrally of the braces 9, 10 and 11 as shown in Figure 3.

The basket includes a series of resilient suspensions 37 arranged in spaced relation, detachably connected to the top of the sides and ends of body part 12, and disposed within the latter at an inward inclination from their upper to their lower ends. A series of resilient inclined suspensions 38 are arranged in pairs, and with the suspensions 38 of each pair oppositely disposed and detachably connected to the arms of a support, and two pairs of resilient suspensions 39. The suspensions 39 of each pair are disposed at opposite inclinations and are connected together at their upper ends by a circular split head 40 (Figure 11) and a pair of incurved oppositely disposed coupling parts 41, 42 which depend from the ends of head 40 and merge into the upper ends of a pair of suspensions 39.

Each of the suspensions 37, 38 (Figures 4 and 5) is formed from a strip 43 of spring metal of the desired length and width. The strip 43 has its upper terminal portion bent in a manner to form a circular resilient hook 44 and an abutment 45. The strip 43 has its lower terminal portion bent in a manner to provide an upwardly inclined angularly disposed resilient seat 46. Each suspension 37, 38 includes a shank 47 which extends upwardly from the inner end of the lower portion of seat 46. Each pair of suspensions 39 is formed from a single strip of spring metal bent to form the head 40, the oppositely disposed coupling parts 41, 42 and the pair of suspensions 39. Each of the suspensions 39 includes an inclined shank 48 merging at its upper end into a coupling part 41, 42 and has its lower end formed with a seat 49 corresponding in form to that of any one of the seats 46. The seat of each of the suspensions referred to includes a lower portion 50 and an upper portion 51 which overlaps, is spaced from and of less length than portion 50.

When a suspension 37 is mounted in position the hook 44 thereof extends around and frictionally binds against the frame 4 at a point thereof, the abutment 45 extends between the frames 3, 4, bears against frame 3 at a point thereof and the shank 47 extends downwardly at an inward inclination relative to frame 3. When a pair of oppositely disposed suspensions 38 are mounted in position on a support, the hook 44 of one of the suspensions 38 of the pair extends around the inner face of arm 21 at a point of the latter within the loop 29, the abutment 45 of said suspension extends between the arms 21, 30, bears against arm 30 and the shank 47 extends downwardly at an inclination towards the shank of a suspension 37 or a suspension 39 as the case might be. The other suspension 38 of the pair is arranged relatively to the arms 22, 31 of the support in the same manner as a suspension 38 is arranged relatively to the arms 21, 30 of such support.

When a pair of suspensions 39 are mounted in position the head 40, which is common to the suspension of the pair, is mounted in encompassing frictional relation with respect to the brace 11, the coupling parts 41, 42 extend between the braces 11, 10 and bear against opposite parts of the brace 10, the upper portions of shanks 47 of the suspension 39 also bear against opposite parts of brace 10 and the said shanks depend from brace 10 at opposite inclinations.

The suspensions are arranged in a set of four and with the suspensions of each set disposed at right angles to each other. The suspensions of each set resiliently support a drinking glass 52 (Figure 2) and retains the latter within the basket during the washing, rinsing and drying operation. The seats of the suspensions are spaced above the open bottom of the basket. The suspensions of a set constitute a resilient latching means for the glass 52. The latter, when in position to be cleaned, is inverted and has its edge and inner face engaged by the seats of a set of suspensions in the manner as shown in Figure 3.

Each of four of the sets of suspensions consists of a pair of suspensions 37 and a pair of suspenions 38. Each of the other sets of suspensions consists of a pair of suspensions 38, a single suspension 37 and a single suspension 39. As illustrated, by way of example, the basket is of a capacity for simultaneously positioning eight glasses to be acted upon, but it is to be understood that the capacity of the basket may be as desired.

Figure 12 illustrates a modification of the body part of the basket and the substitution of separate suspensions for the integral pairs of suspensions 39. In Figure 12 in lieu of employing a single pair of upper transverse braces, two pairs of upper braces are employed. One pair of upper braces are designated 53, 54 and are arranged in sidewise spaced parallel relation. The braces of the other upper pair are indicated at 55, 56 and are arranged in sidewise spaced parallel relation. The braces 53, 54 are disposed in superposed alignment with the braces 55, 56 respectively. The braces 55, 56 are arranged in close proximity of the braces 53, 54 respectively. A brace 53 and a brace 55 will have connected thereto a pair of spaced parallel suspensions 57, only one shown. A brace 54 and 56 will have connected thereto a pair of spaced parallel suspensions 58, only one shown. The suspensions 57 align with the suspensions 58. The suspensions 57, 58 are oppositely disposed. The suspensions 57, 58 are of the same construction as the suspensions 37, 38. The braces 53, 54 are constructed and arranged similar to the brace 11. The braces 55, 56 are of the same form and are arranged in the same manner as the brace 10.

With reference to Figure 13, a modified form of suspension 59 is shown and it is of the same construction as a suspension 37 or 38 with this exception that its seat 60 is of a different form to that of seat 46. The seat 60 consists of providing shank 61 with an inwardly extending angled lower end portion 62 provided at its free end with a globular enlargement 63. Otherwise that what has been stated, suspension 59 will correspond to the form of the suspensions 37, 38.

What I claim is:—

1. A basket for the purpose set forth comprising a body part open at its top and at its bottom including a pair of sides and a pair of ends, a series of resilient, depending, latching suspensions connected to the tops of said sides and depending into said body part, a plurality of resilient, depending, latching suspensions connected to the tops of said ends and depending into said body part, inwardly extending outer supports fixed to said sides and ends, upper and lower transverse bracing means connecting said sides, a pair of oppositely extending resilient latching suspensions carried by each support and depending therefrom, a pair of oppositely extending inner supports secured to the said bracing means, a pair of oppositely extending resilient latching suspensions connected to each inner support, and two spaced parallel pairs of depending resilient latching suspensions secured to said upper transverse bracing means, the suspensions coacting with each other for resiliently latching the glasses in inverted spaced relation within said body part.

2. A basket comprising a body part formed of skeleton sides and ends, an open bottom and an open top, said body part including superposed transverse braces, oppositely extending resilient latching suspensions mounted on the upper of said transverse braces and depending from such brace, spaced outer supports of L-shaped form arranged within and anchored to said body part extending inwardly from the sides and ends of said body part, spaced resilient latching suspensions connected to said sides and ends and depending within said body part, a pair of oppositely extending resilient latching suspensions connected to and depending from each of said supports, the suspensions being arranged in sets, the said suspensions of each set being provided with means at their lower ends for suspending a glass in inverted position within said body part.

3. The invention as set forth in claim 2 having each of said supports including a pair of upper arms coacting to provide a loop and a pair of lower arms, the sides of the loop and the lower arms providing means for supporting the pair of suspensions carried by the support.

4. The invention as set forth in claim 2 having each of said supports formed with shanks terminating at their upper ends into arms disposed at right angles to the shanks, the shanks of certain of said supports being secured to the inner faces of said body and the shanks of the outer supports being secured to opposite sides of said transverse braces.

5. A basket for the purpose set forth comprising a body part formed with skeleton sides and ends, an open bottom and an open top, superposed transversely extending braces arranged within and anchored to said sides, upstanding supports secured to opposite sides of said braces and each formed with a looped upper part, spaced resilient depending latching suspensions connected with the top of said sides and ends arranged within and extending from said body part, spaced upstanding supports secured to the inner faces of said sides and ends and each having a looped upper part, and a pair of oppositely disposed depending resilient latching suspensions connected to the looped upper part of each of said several supports and coacting with the said other latching suspensions for resiliently supporting and latching glasses within an inverted position in said body part.

ANDERS R. LOFSTRAND, Sr.